(12) United States Patent
Na et al.

(10) Patent No.: US 9,933,764 B2
(45) Date of Patent: Apr. 3, 2018

(54) ROTATING SHAFT DEVICE WITH VARIABLE TORSION, ELECTRONIC DEVICE AND CONTROL METHOD THEREOF

(71) Applicant: Lenovo (Beijing) Co., Ltd., Beijing (CN)

(72) Inventors: Zhigang Na, Beijing (CN); Huajun Dong, Beijing (CN); Maojiang Shen, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 377 days.

(21) Appl. No.: 14/755,260

(22) Filed: Jun. 30, 2015

(65) Prior Publication Data

US 2016/0274597 A1    Sep. 22, 2016

(30) Foreign Application Priority Data

Mar. 16, 2015    (CN) .......................... 2015 1 0114107

(51) Int. Cl.
  *G05D 15/01*    (2006.01)
  *G05B 15/02*    (2006.01)
  (Continued)

(52) U.S. Cl.
  CPC .............. *G05B 15/02* (2013.01); *E05D 11/08* (2013.01); *G06F 1/1679* (2013.01); *G06F 1/1681* (2013.01); *E05D 2011/088* (2013.01)

(58) Field of Classification Search
  CPC ... E05D 11/08; E05D 2011/088; G05B 15/02; G06F 1/1616; G06F 1/1681; G05D 15/01
  (Continued)

(56) References Cited

U.S. PATENT DOCUMENTS 5,481,430 A * 1/1996 Miyagawa ............ G06F 1/1618
                                              16/223
6,424,245 B1 * 7/2002 Rector .................... G05G 5/05
                                              335/220

(Continued)

FOREIGN PATENT DOCUMENTS

CN    104035742 A    9/2014
CN    104279221 A    1/2015

OTHER PUBLICATIONS

First Chinese Office Action regarding Application No. 201510114107.3 dated Jun. 29, 2017. English translation provided by http://globaldossier.uspto.gov.

*Primary Examiner* — Chun Cao
(74) *Attorney, Agent, or Firm* — Harness, Dickey & Pierce, P.L.C.

(57) ABSTRACT

A rotating shaft device, an electronic device and a control method thereof are provided according to the present application. The rotating shaft device includes a driving component and a rotating component. The driving component is configured to receive a control signal, and adjust a torsion force of the rotating component based on the control signal. In the case that the rotating shaft device is applied on the electronic device, various control signals may be provided to control the driving component to adjust a torsion force of the rotating component by the controller, such that the torsion force of the electronic device in a folding or unfolding process is smaller than the torsion force of the electronic device in a state being maintained, which solves the issue of poor user experience resulted from being difficult to fold or unfold and inconvenient to operate.

14 Claims, 3 Drawing Sheets

(51) Int. Cl.
*E05D 11/08* (2006.01)
*G06F 1/16* (2006.01)

(58) Field of Classification Search
USPC .......................... 700/275; 16/308, 320, 322
See application file for complete search history.

(56) References Cited

U.S. PATENT DOCUMENTS

| | | | |
|---|---|---|---|
| 8,141,206 B2* | 3/2012 | Chen | G06F 1/1616 |
| | | | 16/337 |
| 8,891,244 B2* | 11/2014 | Yang | G06F 1/1681 |
| | | | 361/679.27 |
| 9,244,497 B2 | 1/2016 | Tsai | |
| 9,449,748 B2* | 9/2016 | Lu | H01F 7/206 |
| 2009/0144934 A1* | 6/2009 | Kitagawa | G06F 1/1616 |
| | | | 16/320 |
| 2015/0009614 A1 | 1/2015 | Tsai | |

* cited by examiner

ROTATING SHAFT DEVICE WITH VARIABLE TORSION, ELECTRONIC DEVICE AND CONTROL METHOD THEREOF

CROSS-REFERENCE TO RELATED APPLICATION

The present application claims the benefit of priority to Chinese patent application No. 201510114107.3 titled "ROTATING SHAFT DEVICE, ELECTRONIC DEVICE AND CONTROL METHOD THEREOF", filed with the Chinese State Intellectual Property Office on Mar. 16, 2015, the entire disclosure of which is incorporated herein by reference.

TECHNICAL FIELD

The present application relates to the technical field of rotating shafts, and particularly to a rotating shaft, an electronic device and a control method thereof.

BACKGROUND

In an electronic device which needs to be folded or unfolded such as a laptop, a clamshell phone, a rotating shaft plays a role of connecting a system and a display screen, supporting the display screen's own weight and maintaining various usage modes of the electronic device.

In order to meet the test requirement for service life of a rotating shaft, and making the display stay stable at various angles in daily use, it is required that not only the rotating shaft itself should have enough strength and torsion force, but also the structural member which is connected to the rotating shaft should have enough fixing strength and torsion force, thus it is difficult and inconvenient for a user to fold or unfold the electronic device, causing poor user experience.

SUMMARY

In view of the above technical issues, a rotating shaft, an electronic device and a control method thereof are provided according to the present application, which may solve the issue of poor user experience resulted from being difficult to fold or unfold and inconvenient to operate.

For addressing the above issue, the following technical solutions are provided according to the present application.

A rotating shaft device includes a driving component and a rotating component, wherein the driving component is configured to receive a control signal and adjust a torsion force of the rotating component based on the control signal.

Preferably, the rotating component includes: a first fixing member and a second fixing member sleeved on and connected to the first fixing member, and a third fixing member sleeved on and connected to the first fixing member and movably connected to the second fixing member.

Preferably, a torsion force of the rotating component is adjusted via the driving component by changing a force acted between the second fixing member and the third fixing member.

Preferably, the first fixing member includes a first supporting rod and a first rotating shaft which is connected to the first supporting rod fixedly and perpendicularly, and the second fixing member and the third fixing member are sleeved on the first rotating shaft.

Preferably, the second fixing member and the third fixing member are sleeved on the first rotating shaft in parallel with each other, the damping between the second fixing member and the third fixing member is adjusted via the driving component by adjusting a distance between the second fixing member and the third fixing member.

Preferably, the third fixing member is provided with a disc spring at a side facing towards the second fixing member, and the damping between the second fixing member and the third fixing member is adjusted via the driving component by adjusting the compression of the disc spring.

Preferably, a torsion force between the second fixing member and the third fixing member is adjusted via the driving component by adjusting the relative position between the second fixing member and the third fixing member.

Preferably, the second fixing member includes a position-limiting ring and multiple position-limiting grooves provided on an inner wall of the position-limiting ring;

the third fixing member includes a fixing shaft fixedly connected to the first fixing member, and a telescopic rod arranged on the fixing shaft;

in the case that the telescopic rod extends out of the fixing shaft, an extending end of the telescopic rod engages in one of the multiple position-limiting grooves, and thus the telescopic rod and the position-limiting ring are immobilized with respect to each other; and in the case that the telescopic rod retracts into the fixing shaft, the extending end of the telescopic rod disengages from the position-limiting ring, and the telescopic rod separates from the position-limiting ring.

Preferably, the second fixing member includes a position-limiting ring, and multiple position-limiting grooves are provided on an inner wall of the position-limiting ring;

the third fixing member includes a fixing shaft fixedly connected to the first fixing member, and a telescopic rod arranged on the fixing shaft; and in the case that the telescopic rod extends out of the fixing shaft, multiple extending ends of the telescopic rod engage in corresponding position-limiting grooves, and thus the position-limiting ring is locked, and in the case that the telescopic rod retracts into the fixing shaft, the extending ends of the telescopic rod disengage from the position-limiting ring, and the position-limiting ring is unlocked.

Preferably, a torsion force between the second fixing member and the third fixing member is adjusted via the driving component by adjusting the relative position between the telescopic rod and the position-limiting ring.

Preferably, the driving component is an electromagnetic driving component or a stepping motor.

An electronic device, includes a first body, a second body and a controller, wherein the first body and the second body are connected in a rotatable manner via the rotating shaft device according to any one of above rotating shaft devices, and the controller is configured to generate and send a first control instruction, the driving component is configured to adjust the rotating component in response to the first control instruction, such that a torsion force of the rotating component is switched to a second torsion force from a first torsion force, wherein the first torsion force is different from the second torsion force in magnitude.

Preferably, the electronic device further includes a sensing component, and the sensing component is configured to detect sensing information and send the sensing information to the controller, and the controller generates a first control instruction based on the sensing information.

Preferably, the sensing component is configured to detect an angle between the first body and the second body, and generate corresponding sensing information based on the angle between the first body and the second body.

Preferably, the sensing component is configured to detect user operation information received by the electronic device, and generate corresponding sensing information based on the received user operation information.

Preferably, the sensing component includes a touch region, and the sensing component detects touch information at the touch region to generate corresponding sensing information.

Preferably, the sensing component includes a pressure sensor, and the sensing component detects pressure information at the pressure sensor to generate corresponding sensing information.

Preferably, the sensing component includes a temperature sensor, and the sensing component detects temperature information at the temperature sensor to generate corresponding sensing information.

Preferably, the controller receives sensing information sent by the sensing component and determines whether the sensing information satisfies a preset condition, and generates and sends a first control instruction if the sensing information satisfies the preset condition.

Preferably, the electronic device further includes a storage, and a comparison threshold is pre-stored in the storage; and the preset condition is that the sensing information is greater than the comparison threshold.

An electronic device control method, applied on the electronic device according to any one of the above electronic devices, includes: generating and sending a first control instruction by the controller; and adjusting the rotating component in response to the first control instruction by the driving component, such that a torsion force of the rotating component is switched to a second torsion force from a first torsion force, wherein the first torsion force is different from the second torsion force in magnitude.

Preferably, the electronic device further includes a sensing component, and the sensing component detects sensing information and sends the sensing information to the controller, and the controller generates a first control instruction based on the sensing information.

Preferably, the sensing component detects an angle between the first body and the second body, and generates corresponding sensing information.

Preferably, the sensing component detects user operation information received by the electronic device, and generates corresponding sensing information.

Preferably, the sensing component includes a touch region, and the sensing component detects touch information at the touch region and generates corresponding sensing information.

Preferably, the sensing component includes a pressure sensor, and the sensing component detects pressure information at the pressure sensor and generates corresponding sensing information.

Preferably, the sensing component includes a temperature sensor, and the sensing component detects temperature information at the temperature sensor, and generates corresponding sensing information.

Preferably, the controller receives sensing information sent by the sensing component, and determines whether the sensing information satisfies a preset condition, and generates and sends a first control instruction if the sensing information satisfies the preset condition.

Compared with the conventional technology, the above technical solutions have the following advantages.

The rotating shaft device according to the present application includes a driving component and a rotating component. The driving component is configured to receive a control signal, and adjust a torsion force of the rotating component based on the control signal. In the case that the rotating shaft device is applied on the electronic device, various control signals may be provided to control the driving component to further adjust a torsion force of the rotating component by the controller, such that the torsion force of the electronic device in a folding or unfolding process is smaller than the torsion force of the electronic device in a state being maintained, which solves the issue of poor user experience resulted from being difficult to be folded or unfolded and inconvenient to be operated.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on the provided drawings without any creative efforts.

DETAILED DESCRIPTION

Figure 1:
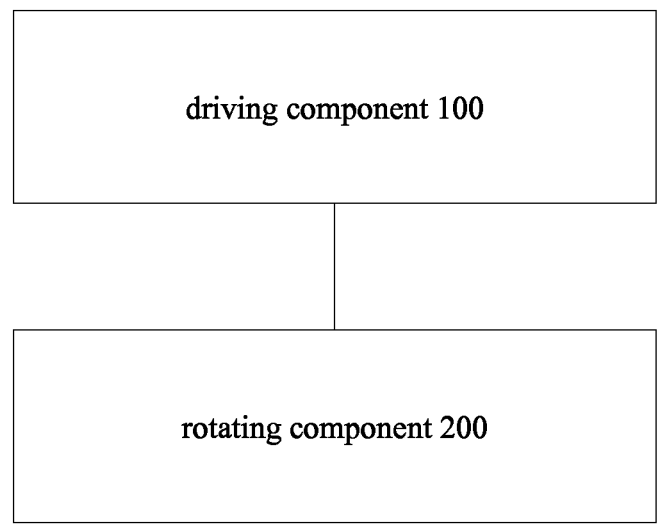
FIG. 1 is a schematic view showing the structure of a rotating shaft device according to an embodiment of the present application.

As described in the background section, a rotating shaft in the conventional technology, when being used in an electronic device, has issue of being difficult to fold or unfold and inconvenient to operate, thus resulting in poor user experience.

In view of this, a rotating shaft device is provided by the present application, which includes a driving component and a rotating component. The driving component is configured to receive a control signal and adjust a torsion force of the rotating component according to the control signal.

Furthermore, an electronic device is further provided by the present application, which includes a first body, a second body and a controller. The first body and the second body are connected with each other in a rotatable manner via the rotating shaft device. The controller is configured to generate and send a first control instruction. The driving component is configured to adjust the rotating component in response to the first control instruction, such that a torsion force of the rotating component is switched to a second torsion force from a first torsion force, wherein the first torsion force is different from the second torsion force in magnitude.

Correspondingly, a control method for an electronic device is further provided by the present application, the method includes:

generating and sending a first control instruction by the controller; and adjusting the rotating component by the driving component in response to the first control instruction, such that a torsion force of the rotating component is switched to a second torsion force from a first torsion force, wherein the first torsion force is different from the second torsion force in magnitude.

Therefore, the rotating shaft device according to the present application, when being applied in an electronic device, may adjust a torsion force of the rotating component by controlling the driving component via a first control instruction generated by the controller, such that the torsion force of the electronic device in a folding or unfolding process is smaller than the torsion force of the electronic device in a state being maintained, which solves the issue of a poor experience for a user resulted from being difficult to fold or unfold and inconvenient to operate.

The above description is the core concept of the present application. The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Although many specific details are explained in the following description so as to fully understand the present application, the present application may also be implemented by other ways other than those described herein, which may be modified by the person skilled in the art without departing from the content of the present application. Therefore, the present application is not limited by the specific embodiments disclosed below.

A rotating shaft device is provided by the present application, which includes a driving component 100 and a rotating component 200. The driving component 100 is configured to receive a control signal, and adjust a torsion force of the rotating component 200 based on the control signal.

Figure 2:
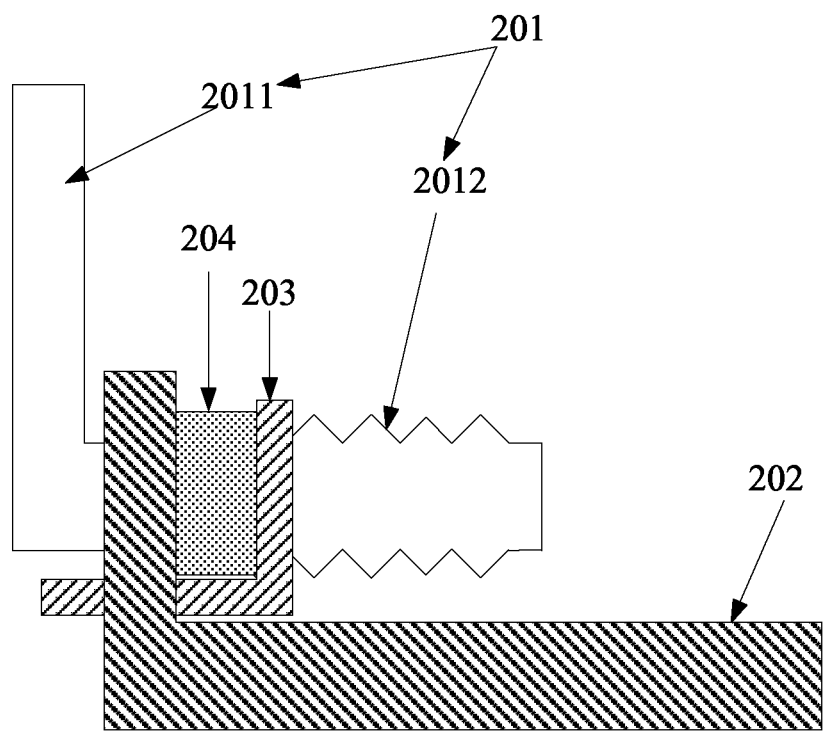
FIG. 2 is a schematic view showing the structure of a rotating component in the rotating shaft device according to the embodiment of the present application.

Based on the above embodiment, in another embodiment of the present application, as shown in FIG. 2, the rotating component 200 includes: a first fixing member 201 and a second fixing member 202 sleeved on and connected to the first fixing member 201; and a third fixing member 203 sleeved on and connected to the first fixing member 201 and movably connected to the second fixing member 202. In this embodiment, a torsion force of the rotating component 200 is adjusted via the driving member 100 by adjusting a force acted between the second fixing member 202 and the third fixing member 203.

Based on the above embodiment, in another specific embodiment of the present application, the first fixing member 201 includes a first supporting rod 2011 and a first rotating shaft 2012 which is connected to the first supporting rod 2011 fixedly and perpendicularly, and the second fixing member 202 and the third fixing member 203 are sleeved on the first rotating shaft 2012. In other embodiments of the present application. The rotating component 200 may optionally include: a rotating shaft and, a first fixing member, a second fixing member, and a third fixing member which are sleeved on and connected to the rotating shaft, wherein the first fixing member, the second fixing member are fixedly connected to the rotating shaft, and the third fixing member is movably connected to the rotating shaft. The present application does not limit to the above, which can be arranged as appropriate.

Based on the above embodiments, in another embodiment of the present application, the second fixing member 202 and the third fixing member 203 are sleeved on the first rotating shaft 2012 of the first fixing member 201 in parallel. The damping between the second fixing member 202 and the third fixing member 203 is adjusted via the driving component 100 by adjusting a distance between the second fixing member 202 and the third fixing member 203, thereby adjusting the force acted between the second fixing member 202 and the third fixing member 203, and further adjusting the torsion force of the rotating shaft device.

In the case that the force acted between the second fixing member 202 and the third fixing member 203 is required to be increased, the distance between the second fixing member 202 and the third fixing member 203 is decreased by the driving component 100, and in the case that the force acted between the second fixing member 202 and the third fixing member 203 is required to be decreased, the distance between the second fixing member 202 and the third fixing member 203 is increased.

Based on the above embodiment, in another preferable embodiment of the present application, the third fixing member 203 is provided with a disc spring 204 at a side facing towards the second fixing member 202, and the driving component 100 may adjust the damping between the second fixing member 202 and the third fixing member 203 by adjusting the compression of the disc spring 204, thereby adjusting the force acted between the second fixing member 202 and the third fixing member 203, and further adjusting the torsion force of the rotating shaft device. The driving component 100 may decrease the force acted between the second fixing member 202 and the third fixing member 203 by decreasing the compression of the disc spring 204, and increase the force acted between the second fixing member 202 and the third fixing member 203 by increasing the compression of the Belleville spring 204.

In another embodiment of the present application, the driving component 100 may further adjust the torsion force between the second fixing member 202 and the third fixing member 203 by adjusting the relative position between the second fixing member 202 and the third fixing member 203.

Figure 3:
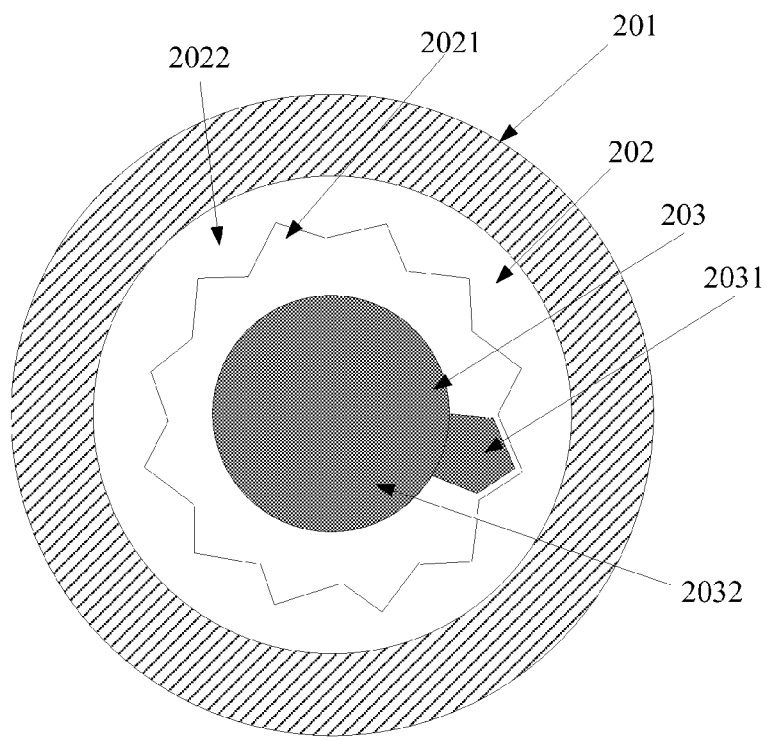
FIG. 3 is a schematic view showing the structure of a rotating component in a rotating shaft device according to another embodiment of the present application.

Based on the above embodiments, in another embodiment of the present application, as shown in FIG. 3, the second fixing member 202 includes a position-limiting ring 2022 and multiple position-limiting grooves 2021 provided on an inner wall of the position-limiting ring 2022. The third fixing member 203 includes a fixing shaft 2032 fixedly connected to the first fixing member 201, and a telescopic rod 2031 arranged on the fixing shaft 2032. In this embodiment, in the case that the telescopic rod 2031 extends out of the fixing shaft 2032, an extending end of the telescopic rod 2031 engages in one of the multiple position-limiting grooves 2021, thus the telescopic rod 2031 and the position-limiting ring 2022 are immobilized with respect to each other, and the force acted between the second fixing member 202 and the third fixing member 203 is relatively large, i.e., the torsion force of the rotating component 200 is relatively large. In the case that the telescopic rod 2031 retracts into the fixing shaft 2032, the extending end of the telescopic rod 2031 disengages from the position-limiting ring 2022, and the telescopic rod 2031 separates from the position-limiting ring 2022, thus the force acted between the second fixing member 202 and the third fixing member 203 is relatively small, which is close to zero, and the torsion force of the rotating component 200 is relatively small.

Figure 4:
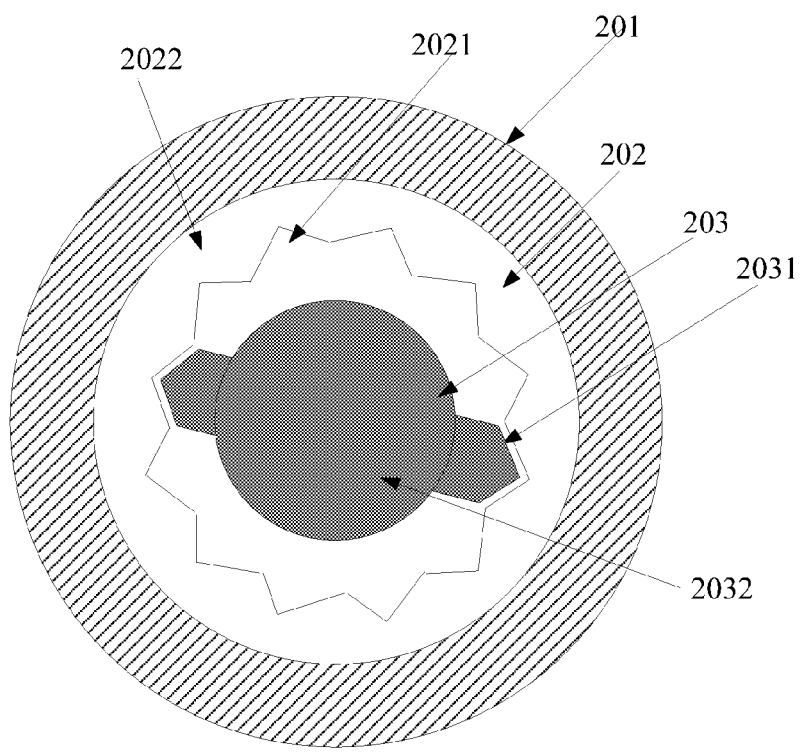
FIG. 4 is a schematic view showing the structure of a rotating component in a rotating shaft device according to still another embodiment of the present application.

In another embodiment of the present application, as shown in FIG. 4, the second fixing member 202 includes a position-limiting ring 2022, and multiple position-limiting grooves 2021 are provided on an inner wall of the position-limiting ring 2022. The third fixing member 203 includes a fixing shaft 2032 fixedly connected to the first fixing member 201 and a telescopic rod 2031 arranged on the fixing shaft 2032. In the case that the telescopic rod 2031 extends out of the fixing shaft 2032, multiple extending ends of the telescopic rod 2031 engage in corresponding position-limiting grooves 2021, thus the position-limiting ring 2022 is locked, and the force acted between the second fixing member 202 and the third fixing member 203 is relatively large, i.e., the torsion force of the rotating component 200 is relatively large. In the case that the telescopic rod 2031 retracts into the fixing shaft 2032, the two extending ends of the telescopic rod 2031 disengage from the position-limiting ring 2022, and the position-limiting ring 2022 is unlocked, thus the force acted between the second fixing member 202 and the third fixing member 203 is relatively small, which is close to zero, and the torsion force of the rotating component 200 is relatively small.

Therefore, in the above two embodiments of the present application, the driving component 100 may adjust a torsion force between the second fixing member 202 and the third fixing member 203 by adjusting the relative position between the telescopic rod 2031 and the position-limiting ring 2022. In other embodiments of the present application, the driving component 100 may be embodied in other forms, and the torsion force between the second fixing member 202 and the third fixing member 203 is adjusted by adjusting the relative position between the second fixing member 202 and the third fixing member 203. The present application does not limit to the above, which be arranged as appropriate.

Based on any of the above embodiments, in another specific embodiment of the present application, the driving component 100 is preferably an electromagnetic driving component or a stepping motor. The present application does not limit to the above, so long as it can adjust the torsion force between the second fixing member 202 and the third fixing member 203.

The rotating shaft device according to the present application includes: a driving component 100 and a rotating component 200. The driving component 100 is configured to receive a control signal, and adjust a torsion force of the rotating component 200 based on the control signal. Thus, in the case that the rotating shaft device is applied on the electronic device, the torsion force of the rotating component 200 may be adjusted by the driving component 100 through being provided with different control signals, such that the torsion force of the electronic device in a folding or unfolding process is smaller than the torsion force of the electronic device in a state being maintained, which solves the issue of a poor experience for a user resulted from being difficult to fold or unfold and inconvenient to operate.

Figure 5:
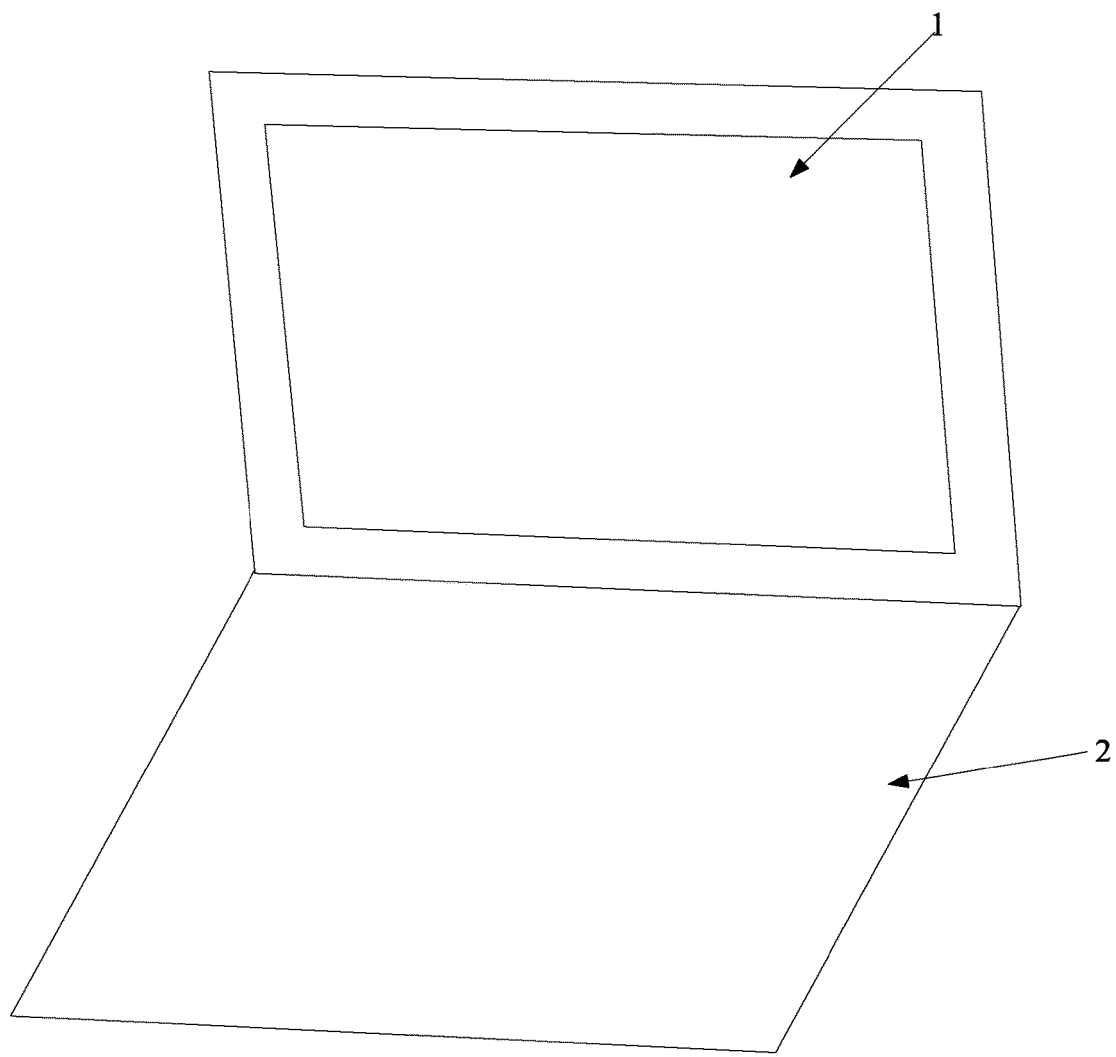
FIG. 5 is a schematic view showing the structure of an electronic device according to an embodiment of the present application.

Furthermore, an electronic device is further provided according to the present application, as shown in FIG. 5, which includes a first body 1, a second body 2 and a controller (not shown). The first body 1 and the second body 2 are connected in a rotatable manner via the rotating shaft device (not shown) according to any one of the above embodiments of the present application. The controller is configured to generate and send a first control instruction. The driving component is configured to adjust the rotating component in response to the first control instruction, such that a torsion force of the rotating component is switched to a second torsion force from a first torsion force, wherein the first torsion force is different from the second torsion force in magnitude.

Based on the above embodiment, in another embodiment of the present application, the first torsion force is greater than the second torsion force, and in still another embodiment of the present application, the first torsion force is smaller than the second torsion force. The present application does not limited to the above, as long as the first torsion force is different from the second torsion force. Hereinafter, the electronic device according to the present application is described by taking the first torsion force being greater than the second torsion force as an example.

In the case that the user needs to unfold the electronic device, i.e., unfold the first body 1 or the second body 2, the controller generates and sends a first control instruction, and the rotating component is adjusted to decrease the torsion force of the rotating component in response to the first control instruction by the driving component, thereby decreasing the torsion force when the user unfolds the first body 1 or the second body 2, such that the user may unfold the first body 1 or the second body 2 by a single hand to unfold the electronic device, thus addressing the issue of being difficult to fold or unfold and inconvenient to operate and improving user experience.

When the user unfolds the electronic device to a certain angle between the first body 1 and the second body 2 and stops unfolding, the controller stops generating the first control signal, and the driving component is deactivated, thus the rotating component maintains the first torsion force, such that the current unfolding state of the electronic device is maintained by the first torsion force.

Based on any of the above embodiments, in another embodiment of the present application, the electronic device further includes a sensing component, and the sensing component detects sensing information and sends the sensing information to the controller, and the controller generates a first control instruction based on the sensing information. Preferably, the controller is configured to receive the sensing information sent by the sensing component, and determine whether the sensing information satisfies a preset condition, and generate and send the first control instruction if the sensing information satisfies the preset condition.

Based on the above embodiment, in another embodiment of the present application, the sensing component is configured to detect an angle between the first body 1 and the second body 2, and generate corresponding sensing information based on the angle between the first body 1 and the second body 2. The controller is configured to determine whether the angle between the first body 1 and the second body 2 satisfies a preset condition, and generate and sent a first control instruction and control the driving component to switch a torsion force of the rotating component from a first torsion force to a second torsion force if the angel between the first body 1 and the second body 2 satisfies the preset condition, thereby decreasing the torsion force used for unfolding the electronic device. In this embodiment, preferably, the preset condition is that the angle between the first body 1 and the second body 2 is smaller than a preset angle, however, the present application does not limit to the above, which can be set as appropriate.

In another embodiment of the present application, the sensing component is configured to detect user operation information received by the electronic device, and generate corresponding sensing information based on the received user operation information. In a preferred embodiment of the present application, the electronic device is provided with a triggering button, and the sensing component is configured to detect triggering information at the triggering button in real time, and generate corresponding sensing information and send the generated corresponding sensing information to the controller. The controller is configured to determine whether the triggering information satisfies a preset condition, and generate and send a first control instruction and control the driving component to switch a torsion force of the rotating component to a second torsion force from a first torsion force if the triggering information satisfies the preset condition, thereby decreasing the action force used for unfolding the electronic device. In this embodiment, the preset condition is that triggering information is detected by the sensing component, however, the present application does not limit to the above, which can be set as appropriate.

In still another embodiment of the present application, the sensing component includes a touch region, and the sensing component detects touch information at the touch region to generate corresponding sensing information. In this embodiment of the present application, the sensing component monitors the touch information at the touch region in real time, and generates corresponding sensing information and sends the generated corresponding sensing information to the controller. The controller is configured to determine whether the touch information satisfies a preset condition, and generate and send a first control instruction and control the driving component to switch a torsion force of the rotating component to a second torsion force from a first torsion force if the touch information detected by the sensing component satisfies the preset condition, thereby decreasing the force used for unfolding the electronic device. In this embodiment, the preset condition is preferably that touch information is detected by the sensing component, however, the present application does not limit to the above, which can be set as appropriate.

In yet another embodiment of the present application, the sensing component includes a pressure sensor, and the sensing component detects pressure information at the pressure sensor to generate corresponding sensing information. In this embodiment, the sensing component monitors pressure information at the pressure sensor in real time, and generates corresponding sensing information and sends the generated corresponding sensing information to the controller. The controller is configured to determine whether the pressure information at the pressure sensor satisfies a preset condition, and generate and send a first control instruction and control the driving component to switch a torsion force of the rotating component to a second torsion force from a first torsion force if the pressure information at the pressure sensor satisfies the preset condition, thereby decreasing the action force used for unfolding the electronic device.

In yet another embodiment of the present application, the sensing component includes a temperature sensor, and the sensing component detects temperature information at the temperature sensor, and generates corresponding sensing information. Preferably, the sensing component detects temperature information at the temperature sensor in real time, and generates corresponding sensing information and sends the generated corresponding sensing information to the controller. The controller is configured to determine whether the temperature information at the temperature sensor satisfies a preset condition, and generate and send a first control instruction and control the driving component to switch a torsion force of the rotating component to a second torsion force from a first torsion force if the temperature information at the temperature sensor satisfies the preset condition, thereby decreasing the action force used for unfolding the electronic device.

Based on the above embodiment, in another embodiment of the present application, the electronic device further includes a storage, and a comparison threshold is pre-stored in the storage. The preset condition is that the sensing information is greater than the comparison threshold, however, the present application does not limit to the above, which can be determined as appropriate.

Correspondingly, an electronic device control method is further provided according to the present application, which is applied on the electronic device according to any one of the above embodiments of the present application. The method includes generating and sending a first control instruction by the controller; and adjusting the rotating component by the driving component in response to the first control instruction, such that a torsion force of the rotating component is switched to a second torsion force from a first torsion force, wherein the first torsion force is different from the second torsion force in magnitude.

Based on the above embodiments, in another embodiment of the present application, the first torsion force is greater than the second torsion force, and in still another embodiment of the present application, the first torsion force is smaller than the second torsion force. The present application does not limit to the above, as long as the first torsion force is different from the second torsion force. Hereinafter, the electronic device according to the present application is described by taking the first torsion force being greater than the second torsion force as an example.

In the case that the user needs to unfold the electronic device, and unfold the first body 1 or the second body 2, the controller generates and sends a first control instruction, and the rotating component is adjusted via the driving component to decrease the torsion force of the rotating component in response to the first control instruction, thereby decreasing the torsion force used for unfolding the first body 1 or the second body 2, such that the user may unfold the first body 1 or the second body 2 by a single hand to unfold the electronic device, thus addressing the issue of being difficult to fold or unfold and inconvenient to operate and improving user experience.

When the user unfolds the electronic device to a certain angle between the first body 1 and the second body 2 and stops unfolding, the controller stops generating and sending the first control signal, and the driving component is deactivated, thus the rotating component maintains the first torsion force, such that the current unfolding state of the electronic device is maintained by the first torsion force.

Based on any of the above embodiments, in another embodiment of the present application, the electronic device further includes a sensing component, and the sensing component detects sensing information and sends the sensing information to the controller, and the controller generates a first control instruction based on the sensing information. Preferably, the controller is configured to receive the sensing information sent by the sensing component, and determine whether the sensing information satisfies a preset condition, and generate and send the first control instruction if the sensing information satisfies the preset condition.

Based on the above embodiment, in another embodiment of the present application, the sensing component is configured to detect an angle between the first body 1 and the second body 2, and generate corresponding sensing information based on the angle between the first body 1 and the second body 2. The controller is configured to determine whether the angle between the first body 1 and the second body 2 satisfies a preset condition, and generate and sent a first control instruction and control the driving component to switch a torsion force of the rotating component from a first torsion force to a second torsion force if the angel between the first body 1 and the second body 2 satisfies the preset condition, thereby decreasing the torsion force used for unfolding the electronic device.

In another embodiment of the present application, the sensing component is configured to detect user operation information received by the electronic device, and generate corresponding sensing information. Preferably, the electronic device is provided with a triggering button, and the sensing component is configured to detect triggering information at the triggering button in real time, and generate corresponding sensing information and send the generated corresponding sensing information to the controller. The controller is configured to determine whether the triggering information satisfies a preset condition, and generate and send a first control instruction and control the driving component to switch a torsion force of the rotating component to a second torsion force from a first torsion force if the triggering information satisfies the preset condition, thereby decreasing the action force used for unfolding the electronic device.

In still another embodiment of the present application, the sensing component includes a touch region, and the sensing component detects touch information at the touch region to generate corresponding sensing information and send the corresponding sensing information to the controller. The controller is configured to determine whether the touch information satisfies a preset condition, and generate and send a first control instruction and control the driving component to switch a torsion force of the rotating component to a second torsion force from a first torsion force if the touch information detected by the sensing component satisfies the preset condition, thereby decreasing the force used for unfolding the electronic device. In this embodiment, the preset condition is preferably that touch information is detected by the sensing component, however, the present application does not limit to the above, which can be set as appropriate.

In yet another embodiment of the present application, the sensing component includes a pressure sensor, and the sensing component detects pressure information at the pressure sensor to generate corresponding sensing information, and generates corresponding sensing information and sends the corresponding sensing information to the controller. The controller is configured to determine whether the pressure information at the pressure sensor satisfies a preset condition, and generate and send a first control instruction and control the driving component to switch a torsion force of the rotating component to a second torsion force from a first torsion force if the pressure information at the pressure sensor satisfies the preset condition, thereby decreasing the action force used for unfolding the electronic device.

In yet another embodiment of the present application, the sensing component includes a temperature sensor, and the sensing component detects temperature information at the temperature sensor, and generates corresponding sensing information and sends the corresponding sensing information to the controller. The controller is configured to determine whether the temperature information at the temperature sensor satisfies a preset condition, and generate and send a first control instruction and control the driving component to switch a torsion force of the rotating component to a second torsion force from a first torsion force if the temperature information at the temperature sensor satisfies the preset condition, thereby decreasing the action force used for unfolding the electronic device.

To sum up, in the electronic device and the control method thereof according to the present application, during the process of increasing or decreasing the angle between the first body and the second body, the first control instruction may be generated and sent by the controller, and the rotating component may be adjusted by the driving component in response to the first control instruction, such that the torsion force of the rotating component is switched to a second torsion force from a first torsion force, wherein the first torsion force is different from the second torsion force in magnitude, thus the torsion force of the electronic device in a folding or unfolding process is smaller than the torsion force of the electronic device in a state being maintained, which solves the issue of a poor experience for a user resulted from being difficult to be folded or unfolded and inconvenient to be operated, and improves user experience.

The sections in the specification are described in a progressive manner. Each of the sections is mainly focused on describing its differences from other sections, and references may be made among these sections with respect to the same or similar portions among these sections.

Based on the above description of the disclosed embodiments, the person skilled in the art may carry out or use the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. A rotating shaft device, comprising:
a driving component;
a rotating component;
a first fixing member and a second fixing member sleeved on and connected to the first fixing member; and
a third fixing member sleeved on and connected to the first fixing member and movably connected to the second fixing member, wherein
the second fixing member comprises a position-limiting ring and a plurality of position-limiting grooves provided on an inner wall of the position-limiting ring,
the third fixing member comprises a fixing shaft fixedly connected to the first fixing member, and a telescopic rod arranged on the fixing shaft,
the driving component is configured to receive a control signal, and adjust the telescopic rod to extend out of the fixing shaft or retract into the fixing shaft based on the control signal,
in the case that the telescopic rod extends out of the fixing shaft, an extending end of the telescopic rod engages in one of the plurality of position-limiting grooves, and the telescopic rod and the position-limiting ring are immobilized with respect to each other, and
in the case that the telescopic rod retracts into the fixing shaft, the extending end of the telescopic rod disengages from the position-limiting ring, and the telescopic rod separates from the position-limiting ring.

2. The rotating shaft device according to claim 1, wherein the first fixing member comprises a first supporting rod and a first rotating shaft which is connected to the first supporting rod fixedly and perpendicularly, and the second fixing member and the third fixing member are sleeved on the first rotating shaft.

3. The rotating shaft device according to claim 1, wherein
the second fixing member comprises a position-limiting ring, and a plurality of position-limiting grooves is provided on an inner wall of the position-limiting ring,
the third fixing member comprises a fixing shaft fixedly connected to the first fixing member, and a telescopic rod arranged on the fixing shaft,
in the case that the telescopic rod extends out of the fixing shaft, multiple extending ends of the telescopic rod engage in corresponding position-limiting grooves, and the position-limiting ring is locked, and
in the case that the telescopic rod retracts into the fixing shaft, the multiple extending ends of the telescopic rod disengage from the position-limiting ring, and the position-limiting ring is unlocked.

4. The rotating shaft device according to claim 1, wherein a torsion force between the second fixing member and the third fixing member is adjusted via the driving component by adjusting the relative position between the telescopic rod and the position-limiting ring.

5. The rotating shaft device according to claim 3, wherein a torsion force between the second fixing member and the third fixing member is adjusted via the driving component by adjusting the relative position between the telescopic rod and the position-limiting ring.

6. The rotating shaft device according to claim 1, wherein the driving component is an electromagnetic driving component or a stepping motor.

7. An electronic device, comprising:
a first body;
a second body; and
a controller, wherein
the first body and the second body are connected in a rotatable manner via a rotating shaft device comprising a driving component and a rotating component,
the controller is configured to generate and send a first control instruction,
the driving component is configured to adjust the rotating component in response to the first control instruction, such that a torsion force of the rotating component is switched to a second torsion force from a first torsion force, wherein the first torsion force is different from the second torsion force in magnitude, and
the rotating shaft device further comprises:
a first fixing member;
a second fixing member sleeved on and connected to the first fixing member; and
a third fixing member sleeved on and connected to the first fixing member and movably connected to the second fixing member, wherein
the second fixing member comprises a position-limiting ring and a plurality of position-limiting grooves provided on an inner wall of the position-limiting ring,
the third fixing member comprises a fixing shaft fixedly connected to the first fixing member, and a telescopic rod arranged on the fixing shaft,
the driving component is configured to receive a control signal, and adjust the telescopic rod to extend out of the fixing shaft or retract into the fixing shaft based on the control signal,
in the case that the telescopic rod extends out of the fixing shaft, an extending end of the telescopic rod engages in one of the plurality of position-limiting grooves, and the telescopic rod and the position-limiting ring are immobilized with respect to each other, and
in the case that the telescopic rod retracts into the fixing shaft, the extending end of the telescopic rod disengages from the position-limiting ring, and the telescopic rod separates from the position-limiting ring.

8. The electronic device according to claim 7, wherein the electronic device further comprises a sensing component, and the sensing component is configured to detect sensing information, and send the sensing information to the controller, and the controller generates a first control instruction based on the sensing information.

9. The electronic device according to claim 8, wherein the sensing component is configured to detect an angle between the first body and the second body, and generate corresponding sensing information based on the angle between the first body and the second body.

10. The electronic device according to claim 8, wherein the sensing component is configured to detect user operation information received by the electronic device and generate corresponding sensing information based on the received user operation information.

11. The electronic device according to claim 10, wherein the sensing component comprises a touch region, and the sensing component detects touch information at the touch region to generate corresponding sensing information.

12. The electronic device according to claim 10, wherein the sensing component comprises a pressure sensor, and the sensing component detects pressure information at the pressure sensor to generate corresponding sensing information.

13. The electronic device according to claim 8, wherein the controller receives sensing information sent by the sensing component and determines whether the sensing information satisfies a preset condition, and generates and sends a first control instruction if the sensing information satisfies the preset condition.

14. An electronic device control method, applied on an electronic device having a first body, a second body and a controller, the first body and the second body are connected in a rotatable manner via a rotating shaft device the rotating shaft device including a driving component and a rotating component, a first fixing member and a second fixing member sleeved on and connected to the first fixing member, and a third fixing member sleeved on and connected to the first fixing member and movably connected to the second fixing member, the second fixing member including a position-limiting ring and a plurality of position-limiting grooves provided on an inner wall of the position-limiting ring, the third fixing member including a fixing shaft fixedly connected to the first fixing member, and a telescopic rod arranged on the fixing shaft the electronic device control method comprising:
generating and sending a first control instruction by the controller;
adjusting the rotating component by the driving component in response to the first control instruction, such that a torsion force of the rotating component is switched to a second torsion force from a first torsion force, wherein the first torsion force is different from the second torsion force in magnitude;
receiving a control signal by the driving component;

adjusting the telescopic rod to extend out of the fixing shaft or retract into the fixing shaft based on the control signal;

in the case that the telescopic rod extends out of the fixing shaft, engaging an extending end of the telescopic rod to one of the plurality of position-limiting grooves, and immobilizing the telescopic rod and the position-limiting ring with respect to each other; and in the case that the telescopic rod retracts into the fixing shaft, disengaging the extending end of the telescopic rod from the position-limiting ring, and separating the telescopic rod from the position-limiting ring.

* * * * *